(12) United States Patent
Agarwal

(10) Patent No.: US 12,314,602 B2
(45) Date of Patent: May 27, 2025

(54) OPTIMIZED PREDICTIVE LOADING IN STORAGE DEVICE

(71) Applicant: Western Digital Technologies, Inc., San Jose, CA (US)

(72) Inventor: Leeladhar Agarwal, Fremont, CA (US)

(73) Assignee: SANDISK TECHNOLOGIES, INC., Milpitas, CA (US)

( * ) Notice: Subject to any disclaimer, the term of this patent is extended or adjusted under 35 U.S.C. 154(b) by 144 days.

(21) Appl. No.: 18/353,033

(22) Filed: Jul. 14, 2023

(65) Prior Publication Data
US 2024/0264769 A1  Aug. 8, 2024

Related U.S. Application Data

(60) Provisional application No. 63/443,665, filed on Feb. 6, 2023.

(51) Int. Cl.
*G06F 3/06* (2006.01)

(52) U.S. Cl.
CPC .......... *G06F 3/0656* (2013.01); *G06F 3/0613* (2013.01); *G06F 3/0673* (2013.01)

(58) Field of Classification Search
CPC ..... G06F 3/0656; G06F 3/0613; G06F 3/0673
USPC .......................................................... 710/52
See application file for complete search history.

(56) References Cited

U.S. PATENT DOCUMENTS

| | | | |
|---|---|---|---|
| 7,908,425 B2 | 3/2011 | Lee et al. | |
| 8,281,078 B2 | 10/2012 | Gendler | |
| 10,025,532 B2 | 7/2018 | Manohar et al. | |
| 10,222,990 B2* | 3/2019 | Bazarsky | G06F 3/0659 |
| 10,642,513 B2* | 5/2020 | Marcu | G06F 3/0635 |
| 12,189,956 B2* | 1/2025 | Doni Gurudath | G06F 12/1009 |
| 2008/0074933 A1* | 3/2008 | Louie | G11C 16/26 365/189.05 |
| 2017/0075629 A1* | 3/2017 | Manohar | G06F 12/0246 |
| 2017/0109096 A1* | 4/2017 | Jean | G06F 3/0679 |
| 2018/0121106 A1 | 5/2018 | Kim | |
| 2018/0173444 A1* | 6/2018 | Marcu | G06F 3/0658 |
| 2019/0163367 A1* | 5/2019 | Bazarsky | G06F 3/0679 |
| 2022/0083256 A1* | 3/2022 | Muthiah | G06F 3/0604 |
| 2022/0334765 A1* | 10/2022 | Jung | G06F 12/0246 |
| 2022/0405206 A1* | 12/2022 | Sreedhar | G06F 3/0611 |

(Continued)

FOREIGN PATENT DOCUMENTS

WO    2020169065 A1    8/2020

*Primary Examiner* — Christopher B Shin
(74) *Attorney, Agent, or Firm* — Morgan, Lewis & Bockius LLP

(57) ABSTRACT

In a data storage device, a controller can optimize predictive loading using a hardware driven data path. In one or more examples, the controller may receive a first request for data from a host system. In response to detecting a pattern, and while transferring data, corresponding to the first request, the controller may load a first portion of data for a subsequent request for data, based on the pattern, from the device memory into a buffer. The controller may also initiate a transfer of a second portion of data for the subsequent request, to a latch in the device memory. In response to receiving the subsequent request, the controller may (i) transfer the first portion of data from the buffer, and (ii) transmit a read request to the device memory, for the second portion of data, thereby causing the device memory to transfer the second portion of data.

20 Claims, 6 Drawing Sheets

(56) References Cited

U.S. PATENT DOCUMENTS

2023/0128954 A1* 4/2023 Benisty ................ G06F 3/0673
 711/154
2024/0303193 A1* 9/2024 Jin ..................... G06F 12/0806

* cited by examiner

OPTIMIZED PREDICTIVE LOADING IN STORAGE DEVICE

CROSS-REFERENCE TO RELATED APPLICATION

This application claims the benefit of U.S. Provisional Application No. 63/443,665, filed on Feb. 6, 2023, the entirety of which is incorporated herein by reference for all purposes.

BACKGROUND

A storage system can be used to store data from a host. The host can request that the storage system store the data in a logical address, and the storage system can maintain a logical-to-physical address table to correlate logical and physical addresses. The storage system can implement data management algorithms, which can move the data to a different physical address than the one in which the data was initially stored. This can result in fragmentation of the memory.

Predictive loading may be used to predict a next host command and data may be buffered in a controller's internal random access memory (RAM) to service the next host command as soon as possible. However, to serve a large command, a larger RAM size is needed. This can increase controller cost. Moreover, firmware interrupted data path is slow, and performance may be lower than a hardware driven data path.

The description provided in the background section should not be assumed to be prior art merely because it is mentioned in or associated with the background section. The background section may include information that describes one or more aspects of the subject technology, and the description in this section does not limit the invention.

BRIEF DESCRIPTION OF THE DRAWINGS

A detailed description will be made with reference to the accompanying drawings.

DETAILED DESCRIPTION

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, the subject technology may be practiced without these specific details. In some instances, structures and components are shown in block diagram form in order to avoid obscuring the concepts of the subject technology. Like components are labeled with identical element numbers for ease of understanding.

The present description relates in general to data storage systems and methods, and more particularly to, for example, without limitation, providing optimized predictive loading in a data storage device.

Figure 1:
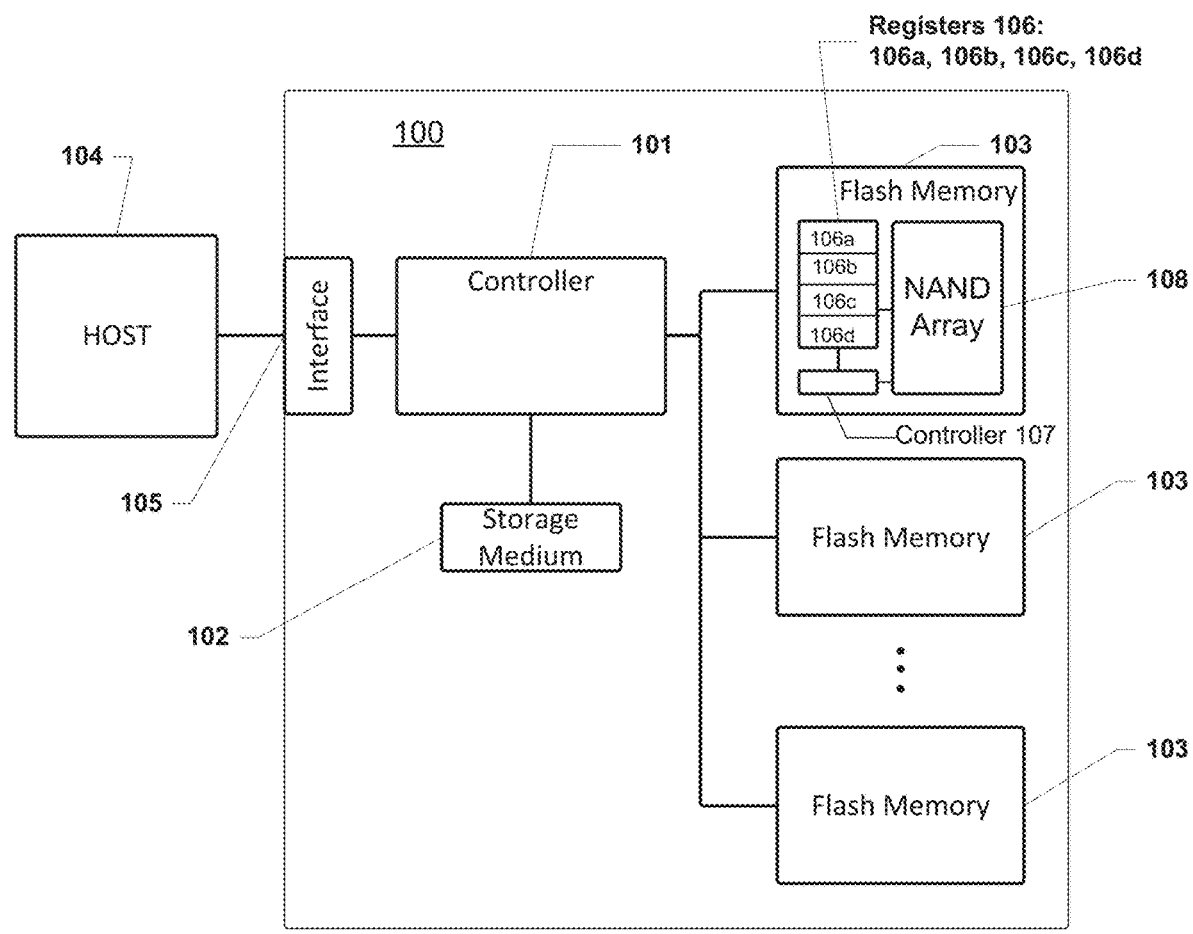
FIG. 1 is a block diagram illustrating components of an example data storage system, according to one or more embodiments.

FIG. 1 is a block diagram illustrating components of an example data storage system, according to aspects of the subject technology. A data storage system may be sometimes referred to as a system, a data storage device, a storage device, or a device. As depicted in FIG. 1, in some aspects, a data storage system 100 (e.g., a solid-state drive (SSD)) includes a data storage controller 101, a storage medium 102, and a flash memory array including one or more flash memory 103. The controller 101 may use the storage medium 102 for temporary storage of data and information used to manage the data storage system 100. The controller 101 may include several internal components (not shown), such as a read-only memory, other types of memory, a flash component interface (e.g., a multiplexer to manage instruction and data transport along a serial connection to the flash memory 103), an input/output (I/O) interface, error correction circuitry, and the like. In some aspects, the elements of the controller 101 may be integrated into a single chip. In other aspects, these elements may be separated on their own personal computer (PC) board.

In some implementations, aspects of the subject disclosure may be implemented in the data storage system 100. For example, aspects of the subject disclosure may be integrated with the function of the data storage controller 101 or may be implemented as separate components for use in conjunction with the data storage controller 101.

The controller 101 may also include a processor that may be configured to execute code or instructions to perform the operations and functionality described herein, manage request flow and address mappings, and to perform calculations and generate commands. The processor of the controller 101 may be configured to monitor and/or control the operation of the components in the data storage controller 101. The processor may be a microprocessor, a microcontroller, a digital signal processor (DSP), an application specific integrated circuit (ASIC), a field programmable gate array (FPGA), a programmable logic device (PLD), a controller, a state machine, gated logic, discrete hardware components, or a combination of the foregoing. One or more sequences of instructions may be stored as firmware on read-only-memory (ROM) within the controller 101 and/or its processor. One or more sequences of instructions may be software stored and read from the storage medium 102, the flash memory 103, or received from a host device 104 (e.g., via a host interface 105). ROM, the storage medium 102, the flash memory 103, represent examples of machine or computer readable media on which instructions/code executable by the controller 101 and/or its processor may be stored. Machine or computer readable media may generally refer to any medium or media used to provide instructions to the controller 101 and/or its processor, including volatile media, such as dynamic memory used for the storage media 102 or for buffers within the controller 101, and non-volatile media, such as electronic media, optical media, and magnetic media.

In some aspects, the controller 101 may be configured to store data received from the host device 104 in the flash memory 103 in response to a write command from the host device 104. The controller 101 is further configured to read data stored in the flash memory 103 and to transfer the read data to the host device 104 in response to a read command from the host device 104. A host device 104 may be sometimes referred to as a host, a host system, or a host computer.

The host device 104 represents any device configured to be coupled to the data storage system 100 and to store data in the data storage system 100. The host device 104 may be a computing system such as a personal computer, a server, a workstation, a laptop computer, a personal digital assistant (PDA), a smart phone, or the like. Alternatively, the host device 104 may be an electronic device such as a digital camera, a digital audio player, a digital video recorder, or the like.

In some aspects, the storage medium 102 represents volatile memory used to temporarily store data and information used to manage the data storage system 100. According to aspects of the subject technology, the storage medium 102 is random access memory (RAM), such as double data rate (DDR) RAM. Other types of RAMs may be also used to implement the storage medium 102. The memory 102 may be implemented using a single RAM module or multiple RAM modules. While the storage medium 102 is depicted as being distinct from the controller 101, those skilled in the art will recognize that the storage medium 102 may be incorporated into the controller 101 without departing from the scope of the subject technology. Alternatively, the storage medium 102 may be a non-volatile memory, such as a magnetic disk, flash memory, peripheral SSD, and the like.

As further depicted in FIG. 1, the data storage system 100 may also include the host interface 105. The host interface 105 may be configured to be operably coupled (e.g., by wired or wireless connection) to the host device 104, to receive data from the host device 104 and to send data to the host device 104. The host interface 105 may include electrical and physical connections, or a wireless connection, for operably coupling the host device 104 to the controller 101 (e.g., via the I/O interface of the controller 101). The host interface 105 may be configured to communicate data, addresses, and control signals between the host device 104 and the controller 101. Alternatively, the I/O interface of the controller 101 may include and/or be combined with the host interface 105. The host interface 105 may be configured to implement a standard interface, such as a small computer system interface (SCSI), a serial-attached SCSI (SAS), a fibre channel interface, a peripheral component interconnect express (PCIe), a serial advanced technology attachment (SATA), a universal serial bus (USB), or the like. The host interface 105 may be configured to implement only one interface. Alternatively, the host interface 105 (and/or the I/O interface of controller 101) may be configured to implement multiple interfaces, which may be individually selectable using a configuration parameter selected by a user or programmed at the time of assembly. The host interface 105 may include one or more buffers for buffering transmissions between the host device 104 and the controller 101. The host interface 105 (or a front end of the controller 101) may include a submission queue 110 to receive commands from the host device 104. For input-output (I/O), the host device 104 may send commands, which may be received by the submission queue 110 (e.g., a fixed size circular buffer space). In some aspects, the submission queue may be in the controller 101. In some aspects, the host device 104 may have a submission queue. The host device 104 may trigger a doorbell register when commands are ready to be executed. The controller 101 may then pick up entries from the submission queue in the order the commands are received, or in an order of priority.

The flash memory 103 may represent a non-volatile memory device for storing data. According to aspects of the subject technology, the flash memory 103 includes, for example, a not-and (NAND) flash memory. The flash memory 503 may include a single flash memory device or chip, or (as depicted in FIG. 1) may include multiple flash memory devices or chips arranged in multiple channels. The flash memory 103 is not limited to any capacity or configuration. For example, the number of physical blocks, the number of physical pages per physical block, the number of sectors per physical page, and the size of the sectors may vary within the scope of the subject technology.

The flash memory may have a standard interface specification so that chips from multiple manufacturers can be used interchangeably (at least to a large degree). The interface hides the inner working of the flash and returns only internally detected bit values for data. In aspects, the interface of the flash memory 103 is used to access one or more internal registers 106 and an internal flash controller 107 for communication by external devices (e.g., the controller 101). In some aspects, the registers 106 may include address, command, and/or data registers 106a, 106b and 106c, which internally retrieve and output the necessary data to and from a NAND memory cell array 108. A NAND memory cell array 108 may be sometimes referred to as a NAND array, a memory array, or a NAND. For example, a data register 106c may include data to be stored in the memory array 108, or data after a fetch from the memory array 108 and may also be used for temporary data storage and/or act like a buffer. The data register 106a may be sometimes referred to as, or may include a latch or a data latch. A latch or a data latch may include one or more latches or one or more data latches. A latch may include one or more latches in a die or may include one or more latches in one or more dies. An address register 106a may store the memory address from which data will be fetched to the host device 104 or the address to which data will be sent and stored. In some aspects, a command register 106b is included to control parity, interrupt control, and the like. In some aspects, the internal flash controller 107 is accessible via a control register to control the general behaviour of the flash memory 103. The internal flash controller 107 and/or the control register may control the number of stop bits, word length, receiver clock source, and may also control switching the addressing mode, paging control, coprocessor control, and the like. In one or more examples, the control register may be within the registers 106. In another example, the control register may be within the internal flash controller 107.

In some aspects, the registers 106 may also include a test register 106d. The test register 106d may be accessed by specific addresses and/or data combinations provided at the interface of flash memory 103 (e.g., by specialized software provided by the manufacturer to perform various tests on the internal components of the flash memory). In further aspects, the test register 106d may be used to access and/or modify other internal registers, for example the command and/or control registers. In some aspects, test modes accessible via the test register 106d may be used to input or modify certain programming conditions of the flash memory 103 (e.g., read levels) to dynamically vary how data is read from the memory cells of the memory arrays 108. The registers 106 (or their components 106a, 106b, 106c, and 106d) may be, or may include, buffers or latches.

It should be understood that in all cases data may not always be the result of a command received from the host 104 and/or returned to the host 104. In some aspects, the controller 101 may be configured to execute a read operation independent of the host 104 (e.g., to verify read levels or BER). The predicate words "configured to," "operable to," and "programmed to" as used herein do not imply any particular tangible or intangible modification of a subject, but, rather, are intended to be used interchangeably. For example, a processor configured to monitor and control an operation or a component may also mean the processor being programmed to monitor and control the operation or the processor being operable to monitor and control the operation. Likewise, a processor configured to execute code can be construed as a processor programmed to execute code or operable to execute code.

The controller 101 may perform the operations identified in blocks 502-510. The controller 101 may cause the operations identified in blocks 502-510 to occur, or the controller 101 may provide instructions to cause or facilitate the controller 107 (and the registers 106) to perform operations identified in blocks 502-510.

Figure 2:
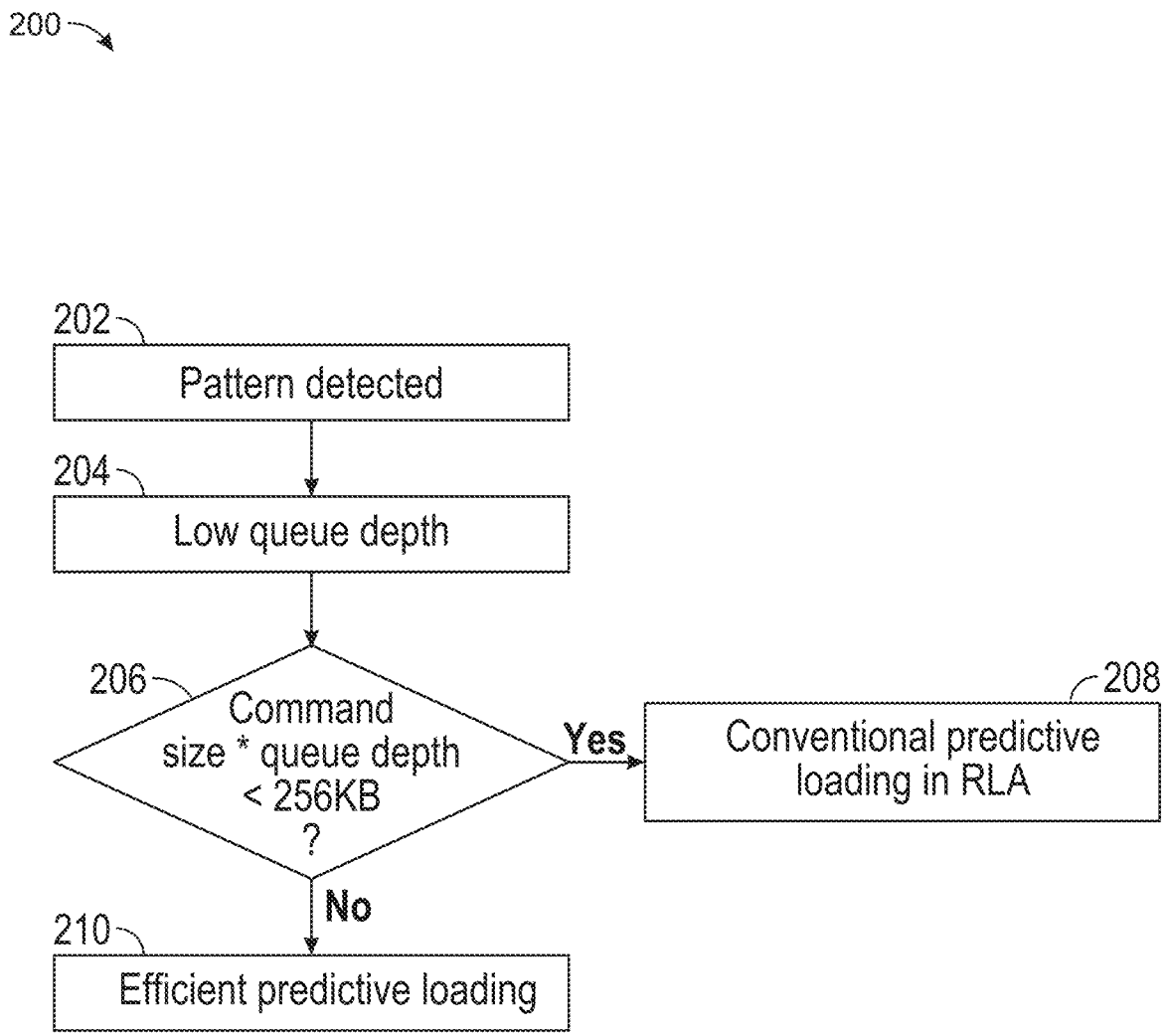
FIG. 2 is a flowchart illustrating an example process for predictive loading in a data storage device, according to one or more embodiments.

FIG. 2 is a flowchart illustrating an example process 200 for predictive loading in a data storage device, according to one or more embodiments. The controller 101 may cause the operations identified in blocks 202-210 to occur, or the controller 101 may provide instructions to cause or facilitate the controller 107 (and the registers 106) to perform operations identified in blocks 202-210. A workload detector (sometimes referred to as a pattern detector) in the control 101 may detect (202) patterns in commands received from a host (e.g., the host 104). The commands may include sequential accesses to memory. The workload detector may be configurable to detect patterns in the sequential accesses based on observing a number of commands (e.g., 3 or 4 commands) received from the host. The controller 101 may include a queue depth for a number of pending commands received from the host. The host 104 may not transmit another command to the device 100 until the queue depth is below a predetermined number of commands (e.g., 32 commands). Suppose the controller 101 determines (204) that the queue depth is below a predetermined low queue depth (e.g., 16). If there are too many pending commands from the host, the controller 101 may not have idle time to perform predictive loading (e.g., prefetch data from the flash memory to a random access memory and serve data from the random access memory). So the threshold check (204) may be performed before the controller 101 performs the predictive loading. If the controller 101 determines (206) that size of data requested for each command in the queue (of pending commands) for the queue depth is below a predetermined total size (e.g., 256 KB), then the controller 101 may perform conventional predictive loading (208) using a read look ahead (RLA) buffer. If not, the controller 101 may perform (210) efficient predictive loading described below in reference to FIG. 3, according to one or more embodiments.

In one or more examples, the read look ahead (RLA) buffer may be a buffer. In one or more examples, the RLA buffer may be, may include, or may be part of, a RAM or a static RAM (SRAM). In one or more examples, the controller 101 and/or the storage medium 102 may include the RLA buffer. The RLA buffer may include one or more RLA buffers. In one or more examples, an RLA buffer is not located within the flash memory 103. In one or more examples, the RLA buffer is not located in the interface 105. In one or more examples, the RLA buffer may be distinct and separate from encoding/decoding buffers (e.g., in the controller 101 or the storage medium 102) utilized while encoding data to be written to the flash memory 103 or decoding data read from the flash memory 103. Encoding and decoding may include hard and soft encoding and hard and soft decoding. A hardware driven data path may include a path of reading data from a NAND array 108, to a latch (e.g., 106c), to a decoding buffer (e.g., in the controller 101 or the storage medium 102) for decoding the read data, to a buffer in the interface 105, and then to the host 104. The hardware driven data path does not include an RLA buffer. In one or more examples, a firmware interrupted data path may include a path of reading data from a NAND array 108, to a latch (e.g., 106c), to an RLA buffer, to a decoding buffer (e.g., in the controller 101 or the storage medium 102) for decoding the read data, to a buffer in the interface 105, and then to the host 104. In one or more other examples, a firmware interrupted data path may include a path of reading data from a NAND array 108, to a latch (e.g., 106c), to a decoding buffer (e.g., in the controller 101 or the storage medium 102) for decoding the read data, to an RLA buffer, to a buffer in the interface 105, and then to the host 104.

Figure 3:
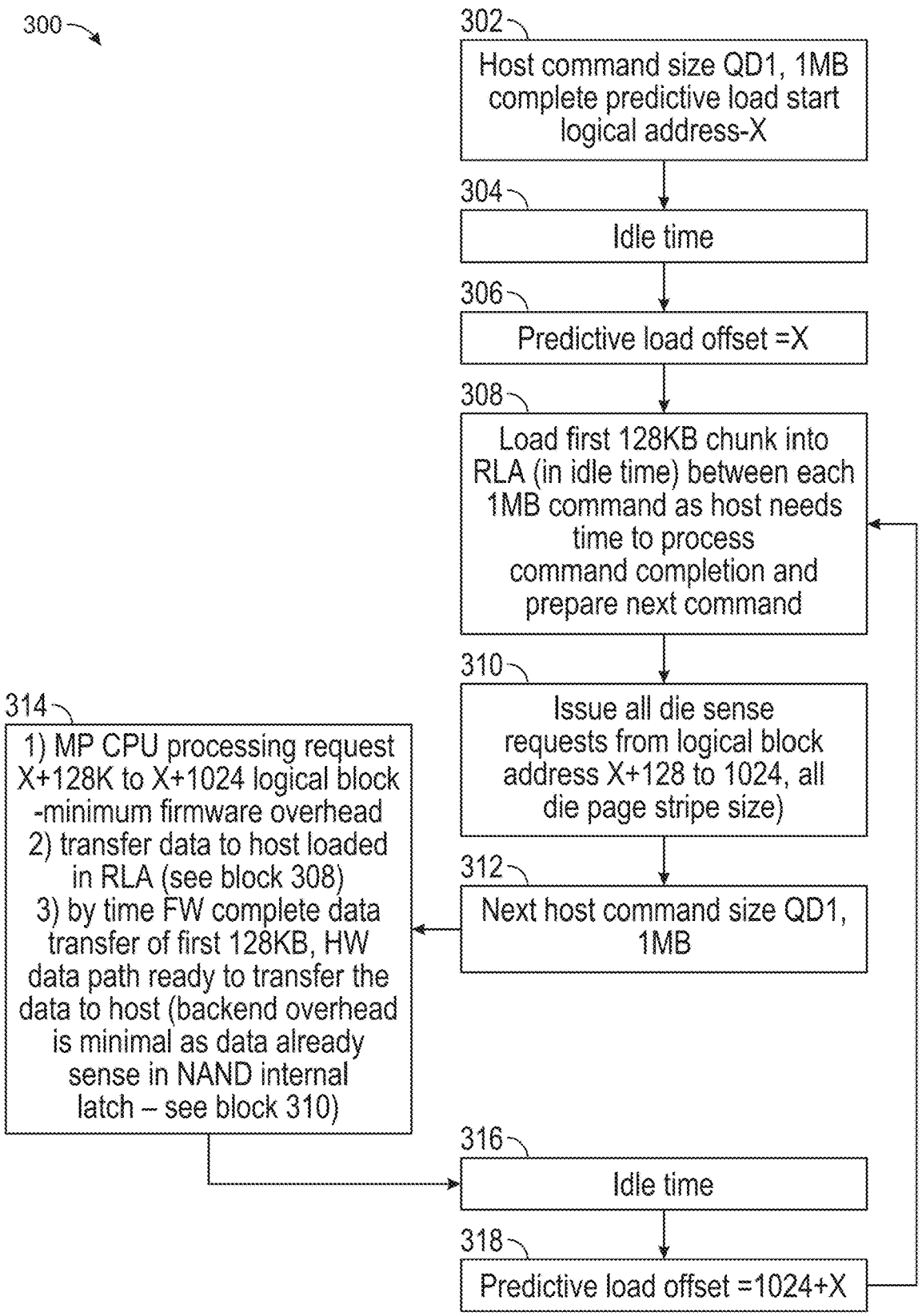
FIG. 3 is a flowchart illustrating an example process for efficient predictive loading in a data storage device, according to one or more embodiments.
Figure 6A:
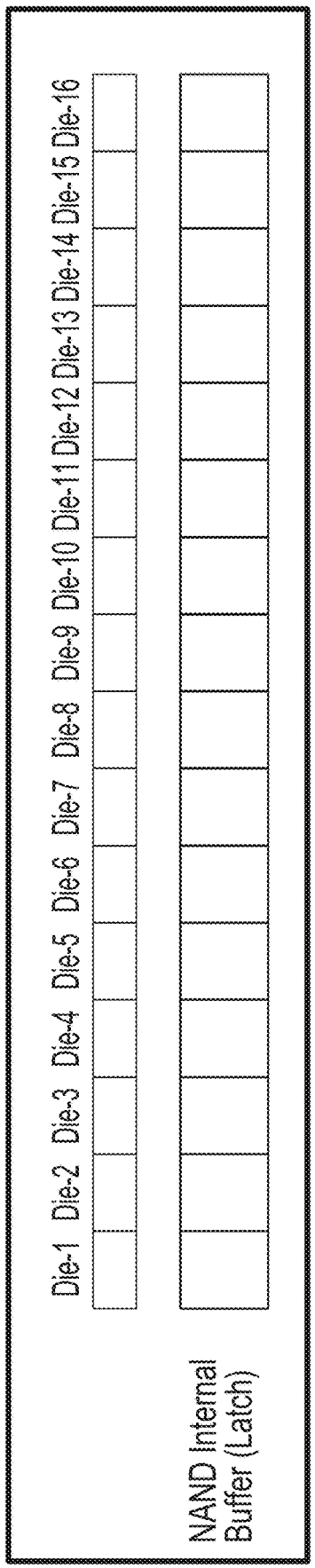
FIG. 6A is a schematic diagram of an example storage system, according to one or more embodiments.
Figure 6B:
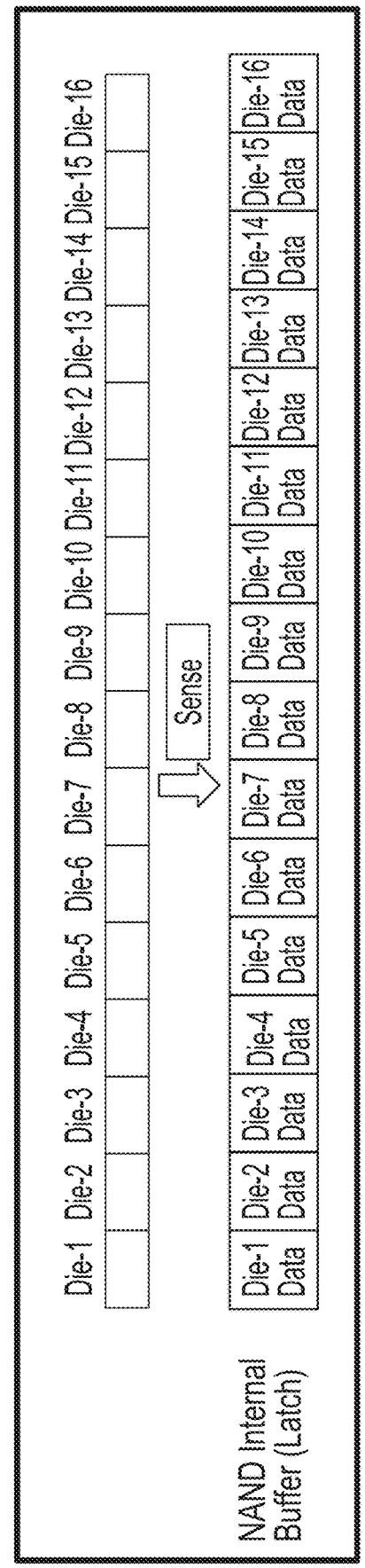
FIG. 6B is a schematic diagram of the example storage system shown in FIG. 6A after sense requests are processed, according to one or more embodiments.

FIG. 3 is a flowchart illustrating an example process 300 for efficient predictive loading (block 210 of FIG. 2) in a data storage device, according to one or more embodiments. Suppose a host sends a command having a size of one queue depth (QD1) and the size of data requested is 1 MB. The example size is for illustration and any predetermined command size may be used to trigger the operations of the controller 101. The controller 101 may complete (302) predictive loading starting at a logical block address minus X, and then enter (304) an idle time (e.g., a period of time when no data transfer is being performed, no host command is received). During this time, the pattern detector may predict (306) that the next host command may correspond to a command for a logical address X. The controller 101 may then load (308) a first 128 KB chunk (or any predetermined amount of data, depending on RAM footprint that may be allocated) into a random access memory (sometimes referred to as a read look ahead buffer or RLA), in idle time, between each 1 MB command. This allows the host time to process command completion and prepare next command. The controller may also issue (310) all die sense requests from logical block address X plus 128 KB to X plus 1024 KB (1 MB), all die page stripe size, for transferring data from NAND array to NAND latch. Number of dies may be different depending on storage capacity. A NAND latch may store data corresponding to only a single page. Only a single page on each die may be sensed at a time. Suppose data has to be retrieved from different dies. Data from each die may have to be stored in a respective latch corresponding to the die. FIG. 6A is a schematic diagram of an example storage system with 16 NAND dies (die-1, die-2, . . . , die-16), according to one or more embodiments. Each NAND die may have a corresponding latch (sometimes referred to as a NAND internal buffer), so the controller may issue sense requests for as much as the number of dies times die page size amount of data. Suppose die page size (sometimes referred to as die page stripe size) is 32 KB. In the example shown, because there are 16 dies, all die sense requests may correspond to as much as 16 times 32 KB, which is 512 KB. FIG. 6B is a schematic diagram of the example storage system shown in FIG. 6A after sense requests are processed, according to one or more embodiments. The latches are filled with corresponding data from each die.

Referring back to FIG. 3, the controller 101 may then receive (312) the next host command for the logical block address X, having a size of one queue depth and corresponding to a data request for 1 MB. As shown in block 314, because the sense requests are already issued, processing of data from logical block address X plus 128 KB to X plus 1024 KB incurs minimum firmware or controller overhead. The controller 101 may transfer data to the host loaded in the read lookahead buffer (block 308). Additionally, by the time the firmware completes the data transfer of the first 128 KB, the hardware data path may be ready to transfer the data to host. Backend overhead is minimal as data is already sensed in a NAND internal latch (block 310). Following block 314, the controller 101 (or a portion therein) may again enter (316) idle time. The pattern detector may predict (318) that the next load offset is likely to be logical block address 1024 KB plus X. The controller 101 and/or the NAND memory may repeat steps 308 through 314, for the subsequent address, and any subsequent addresses similarly, as long as the pattern detector continues to predict sequential accesses.

Figure 4:
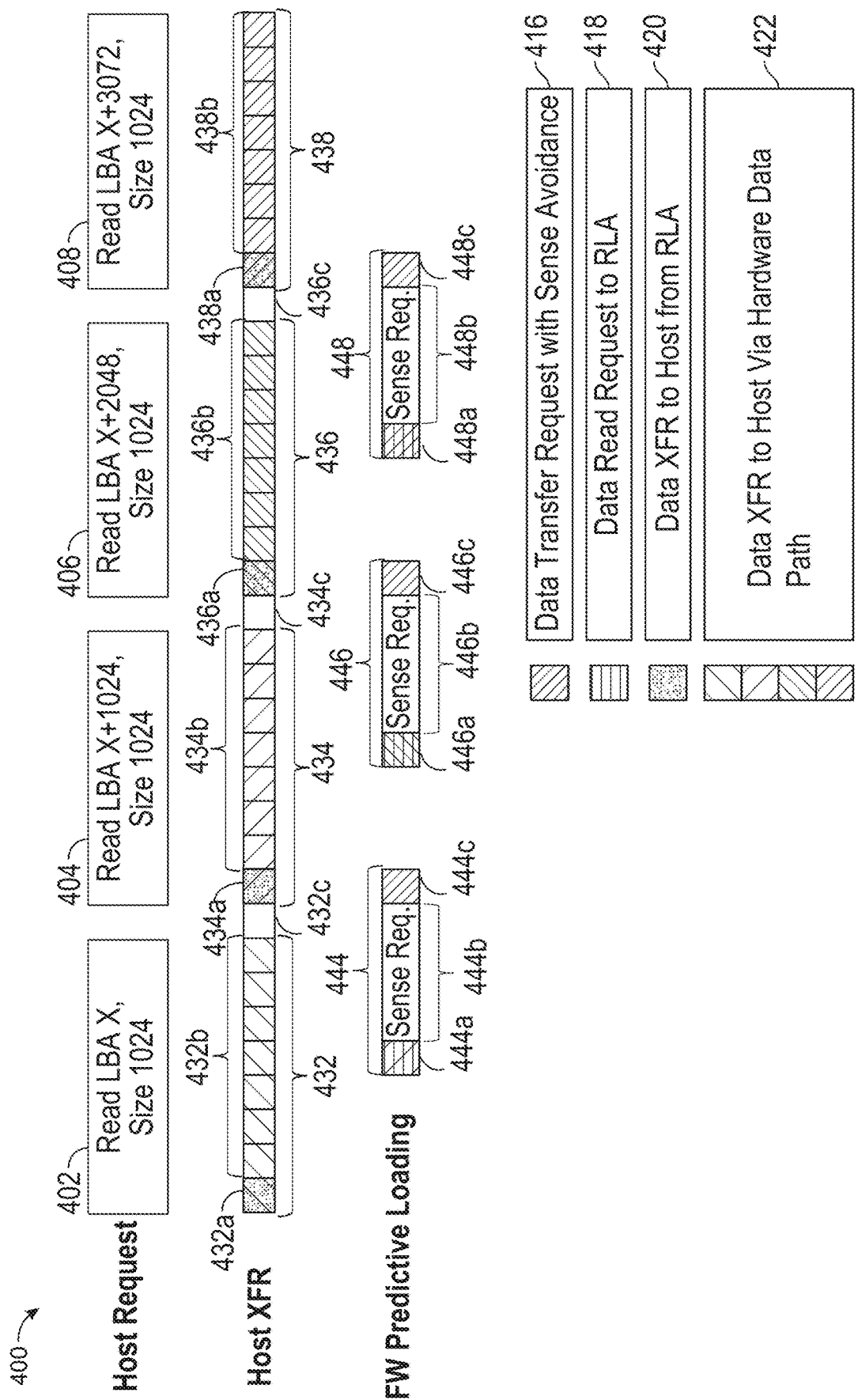
FIG. 4 is a schematic diagram of an example controller command processing flow with efficient predictive loading, according to one or more embodiments.

FIG. 4 is a schematic diagram of an example controller command processing flow 400 with efficient predictive loading, according to one or more embodiments. Suppose a host sends a request 402 to read 1024 KB starting at logical block address X. This request may be handled by a transfer 432 to the host that may include a data transfer 432a to the host from an RLA followed by a data transfer 432b to the host via a hardware data path. While the host transfer 432 is progressing, the firmware (sometimes referred to as the controller 101) may perform predictive loading 444 for a read of 1 MB corresponding to a logical block address X plus 1024. The predictive loading 444 may include a data read request 444a to read data to the RLA (e.g., the first 128 KB for the logical block address X+1024), followed by a sense request 444b to read data from a NAND memory to a NAND latch. The host may follow with a read request 404 for 1 MB starting at the logical block address X plus 1024. There may be a period of time (e.g., interval indicated by label 432c) between two consecutive host requests (e.g., the host requests 402 and 404). This data transfer request may be handled with sense avoidance 444c. Initial 128 KB of data for the request may be transferred 434a from the RLA based on the predictive loading 444a. Subsequent data 434b for the request may be transferred via the hardware data path, based on the sense request 444b.

While the host transfer 434 is progressing, the firmware may perform predictive loading 446 for a read of 1 MB corresponding to a logical block address X plus 2048. The predictive loading 446 may include a data read request 446a to read data to the RLA (e.g., the first 128 KB for the logical block address X+2048), followed by a sense request 446b to read data from a NAND memory to a NAND latch. The host may follow with a read request 406 for 1 MB starting at the logical block address X plus 2048. There may be a period of time (e.g., interval indicated by label 434c) between two consecutive host requests (e.g., the host requests 404 and 406). This data transfer request may be handled with sense avoidance 446c. Initial 128 KB of data for the request may be transferred 436a from the RLA based on the predictive loading 446a. Subsequent data 436b for the request may be transferred via the hardware data path, based on the sense request 446b. This process may be repeated for the host request 408 which may be handled via the host transfer 438. may be handled with sense avoidance 446c. Initial 128 KB of data for the request may be transferred 438a from the RLA based on predictive loading 448a. Subsequent data 438b for the request may be transferred via the hardware data path, based on the sense request 448b. The controller 101 may repeat these steps for as long as the pattern predictor predicts sequential accesses to memory.

Figure 5:
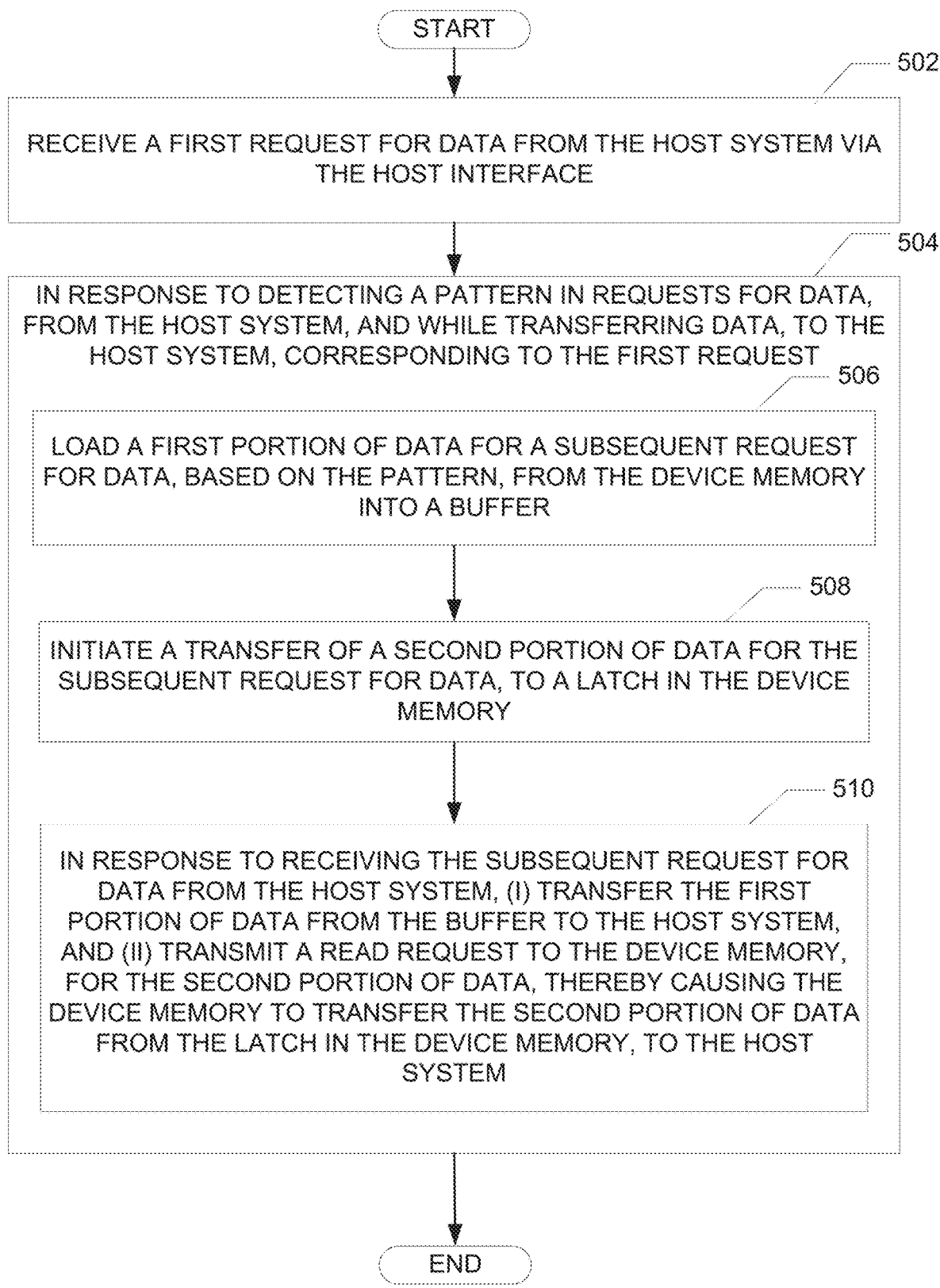
FIG. 5 is a flowchart illustrating an example process for efficient predictive loading in a storage device, according to one or more embodiments.

It may be instructive to describe the structures shown in FIGS. 1, 2, 3, and 4, with respect to FIG. 5, a flowchart illustrating an example process 500 for efficient predictive loading in a storage device, according to one or more embodiments. One or more blocks of FIG. 5 may be executed by a computing system (including, e.g., a controller of a flash memory, a data storage controller of a data storage system or a solid state storage device (SSD), a processor, or the like). Example of a computing system or a controller may be the controller 101. Similarly, a non-transitory machine-readable medium may include machine-executable instructions thereon that, when executed by a computer or machine, perform the blocks of FIG. 5. The steps of process 500 may be implemented as hardware, firmware, software, or a combination thereof. For example, a data storage device (e.g., the storage device 100) includes a submission queue for receiving host commands from a host system. The data storage device may include a host interface (e.g., the host interface 105) for coupling the data storage device to a host system. The data storage device may also include device memory. The device memory may include one or more memories (e.g., one or more flash memory 103). The data storage device also includes a controller (e.g., the controller 101).

The controller 101 may be configured to receive (502) a first request for data from the host system via the host interface. The controller 101 may be configured to in response to detecting a pattern in requests for data, from the host system, and while transferring data, to the host system (504), the controller may perform following steps. The controller 101 may load (506) a first portion of data (e.g., 434a, 436a, or 438a) for a subsequent request for data, based on the pattern, from the device memory into a buffer. The controller 101 may also initiate (510) a transfer of a second portion of data (e.g., one or more blocks in 434b, one or more blocks in 436b, or one or more blocks in 438b) for the subsequent request for data, to a latch in the device memory. In response to receiving the subsequent request for data from the host system, the controller 101 may also transfer (510) (i) the first portion of data from the buffer, and (ii) the second portion of data from the latch in the device memory, to the host system.

In some aspects, the controller 101 may be further configured to, in accordance with a determination that (i) a depth of a queue for commands from the host system is below a predetermined threshold, and (ii) a size of commands in the queue for commands is above a predetermined size, load the first portion of data, and initiate the transfer of the second portion of data, so that in response to receiving the subsequent request for data from the host system, the controller 101 may (i) transferring the first portion of data from the buffer to the host system, and (ii) transmitting a read request to the device memory, for the second portion of data, thereby causing the device memory to transfer the second portion of data from the latch in the device memory, to the host system.

In some aspects, the controller 101 may be configured to, predict, based on the pattern, the subsequent request for data from the host system.

In some aspects, the controller 101 may be configured to, in accordance with a determination that the size of commands in the queue for commands is below the predetermined size, load the first portion of data and the second portion of data into the buffer; and, in response to receiving the subsequent request for data from the host system, transfer the first portion of data and the second portion of data, from the buffer, to the host system.

In some aspects, the first request may correspond to a first logical block address and the subsequent request corresponds to a second logical block address at a predetermined offset from the first logical block address.

In some aspects, the first request may correspond to a read request for a predetermined size of data starting from a first logical block address, the subsequent request may correspond to another read request for the predetermined size of data starting from a second logical block address at an offset from the first logical block address, and the offset may be equal to the predetermined size.

In some aspects, the controller 101 may be configured to continuing to repeat operations for loading a first portion of data and initiating a transfer of a second portion of data for each of sequential requests for data following the subsequent request for data, while transferring data to the host system, as long as the pattern is detected.

Various examples of aspects of the disclosure are described below. These are provided as examples, and do not limit the subject technology.

One or more aspects of the subject technology provide a data storage device that may include a host interface, a device memory and a controller. The host interface may couple the data storage device to a host system. The controller may be configured to receive a first request for data from the host system via the host interface. The controller may also be configured to, in response to detecting a pattern in requests for data, from the host system, and while transferring data, to the host system, corresponding to the first request: load a first portion of data for a subsequent request for data, based on the pattern, from the device memory into a buffer; initiate a transfer of a second portion of data for the subsequent request for data, to a latch in the device memory; and in response to receiving the subsequent request for data from the host system, (i) transfer the first portion of data from the buffer to the host system, and (ii) transmit a read request to the device memory, for the second portion of data, thereby causing the device memory to transfer the second portion of data from the latch in the device memory, to the host system.

In some aspects, the controller may be configured to, in accordance with a determination that (i) a depth of a queue for commands from the host system is below a predetermined threshold, and (ii) a size of commands in the queue for commands is above a predetermined size, load the first portion of data and initiate the transfer of the second portion of data.

In some aspects, the controller may be configured to, predict, based on the pattern, the subsequent request for data from the host system.

In some aspects, the controller may be configured to, in accordance with a determination that the size of commands in the queue for commands is below the predetermined size, load the first portion of data and the second portion of data into the buffer; and, in response to receiving the subsequent request for data from the host system, transfer the first portion of data and the second portion of data, from the buffer, to the host system.

In some aspects, the first request may correspond to a first logical block address and the subsequent request corresponds to a second logical block address at a predetermined offset from the first logical block address.

In some aspects, the first request may correspond to a read request for a predetermined size of data starting from a first logical block address, the subsequent request may correspond to another read request for the predetermined size of data starting from a second logical block address at an offset from the first logical block address, and the offset may be equal to the predetermined size.

In some aspects, the controller may be configured to continue to repeat the operations for loading the first portion of data and initiating the transfer of the second portion of data for sequential requests for data following the subsequent request for data, while transferring data to the host system, as long as the pattern is detected.

In other aspects, methods are provided for efficient predictive loading in data storage devices. According to some aspects, a method may be implemented using one or more controllers for one or more data storage devices. The method may include receiving a first request for data from a host system via a host interface. The method may also include, in response to detecting a pattern in requests for data, from the host system, and while transferring data, to the host system, corresponding to the first request: loading a first portion of data for a subsequent request for data, based on the pattern, from the device memory into a buffer; initiating a transfer of a second portion of data for the subsequent request for data, to a latch in the device memory; and in response to receiving the subsequent request for data from the host system: (i) transferring the first portion of data from the buffer to the host system, and (ii) transmitting a read request to the device memory, for the second portion of data, thereby causing the device memory to transfer the second portion of data from the latch in the device memory, to the host system.

In some aspects, the method may further include, in accordance with a determination that (i) a depth of a queue for commands from the host system is below a predetermined threshold, and (ii) a size of commands in the queue for commands is above a predetermined size, loading the first portion of data and initiating the transfer of the second portion of data.

In some aspects, the method may further include, predicting, based on the pattern, the subsequent request for data from the host system.

In some aspects, the method may further include: in accordance with a determination that the size of commands in the queue for commands is below the predetermined size, loading the first portion of data and the second portion of data into the buffer; and in response to receiving the subsequent request for data from the host system, transferring the first portion of data and the second portion of data, from the buffer, to the host system.

In some aspects, the first request may correspond to a first logical block address and the subsequent request may correspond to a second logical block address at a predetermined offset from the first logical block address.

In some aspects, the first request may correspond to a read request for a predetermined size of data starting from a first logical block address. The subsequent request may correspond to another read request for the predetermined size of data starting from a second logical block address at an offset from the first logical block address. The offset may be equal to the predetermined size.

In some aspects, the method may further include continuing to repeat the operations for loading the first portion of data and initiating the transfer of the second portion of data for sequential requests for data following the subsequent request for data, while transferring data to the host system, as long as the pattern is detected.

In further aspects, a system may include a means for receiving a first request for data from a host system via a host interface. The system may also include a means for, in response to detecting a pattern in requests for data, from the host system, and while transferring data, to the host system, corresponding to the first request: loading a first portion of data for a subsequent request for data, based on the pattern, from the device memory into a buffer; initiating a transfer of a second portion of data for the subsequent request for data, to a latch in the device memory; and in response to receiving the subsequent request for data from the host system, (i) transferring the first portion of data from the buffer to the host system, and (ii) transmitting a read request to the device memory, for the second portion of data, thereby causing the device memory to transfer the second portion of data from the latch in the device memory, to the host system.

In some aspects, the system may further include means for, in accordance with a determination that (i) a depth of a queue for commands from the host system is below a predetermined threshold, and (ii) a size of commands in the queue for commands is above a predetermined size, loading the first portion of data and initiating the transfer of the second portion of data.

In some aspects, the system may further include means for, predicting, based on the pattern, the subsequent request for data from the host system.

In some aspects, the system may further include: means for, in accordance with a determination that the size of commands in the queue for commands is below the predetermined size, loading the first portion of data and the second portion of data into the buffer; and means for, in response to receiving the subsequent request for data from the host system, transferring the first portion of data and the second portion of data, from the buffer, to the host system.

Disclosed are systems and methods providing efficient predictive loading. Thus, the described methods and systems provide performance benefits that improve the functioning of a storage device.

It is understood that other configurations of the subject technology will become readily apparent to those skilled in the art from the detailed description herein, wherein various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

Those of skill in the art would appreciate that the various illustrative blocks, modules, elements, components, methods, and algorithms described herein may be implemented as electronic hardware, computer software, or combinations of both. To illustrate this interchangeability of hardware and software, various illustrative blocks, modules, elements, components, methods, and algorithms have been described above generally in terms of their functionality. Whether such functionality is implemented as hardware or software depends upon the particular application and design constraints imposed on the overall system. Skilled artisans may implement the described functionality in varying ways for each particular application. Various components and blocks may be arranged differently (e.g., arranged in a different order, or partitioned in a different way) all without departing from the scope of the subject technology.

It is understood that the specific order or hierarchy of steps in the processes disclosed is an illustration of exemplary approaches. Based upon design preferences, it is understood that the specific order or hierarchy of steps in the processes may be rearranged. Some of the steps may be performed simultaneously. The accompanying method claims present elements of the various steps in a sample order, and are not meant to be limited to the specific order or hierarchy presented.

The previous description is provided to enable any person skilled in the art to practice the various aspects described herein. The previous description provides various examples of the subject technology, and the subject technology is not limited to these examples. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject technology.

A phrase such as an "aspect" does not imply that such aspect is essential to the subject technology or that such aspect applies to all configurations of the subject technology. A disclosure relating to an aspect may apply to all configurations, or one or more configurations. An aspect may provide one or more examples. A phrase such as an aspect may refer to one or more aspects and vice versa. A phrase such as an "embodiment" does not imply that such embodiment is essential to the subject technology or that such embodiment applies to all configurations of the subject technology. A disclosure relating to an embodiment may apply to all embodiments, or one or more embodiments. An embodiment may provide one or more examples. A phrase such as an "embodiment" may refer to one or more embodiments and vice versa. A phrase such as a "configuration" does not imply that such configuration is essential to the subject technology or that such configuration applies to all configurations of the subject technology. A disclosure relating to a configuration may apply to all configurations, or one or more configurations. A configuration may provide one or more examples. A phrase such as a "configuration" may refer to one or more configurations and vice versa.

The word "exemplary" is used herein to mean "serving as an example or illustration." Any aspect or design described herein as "exemplary" is not necessarily to be construed as preferred or advantageous over other aspects or designs.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for." Furthermore, to the extent that the term "include," "have," or the like is used in the description or the claims, such term is intended to be inclusive in a manner similar to the term "comprise" as "comprise" is interpreted when employed as a transitional word in a claim.

What is claimed is:

1. A data storage device, comprising:
a host interface for coupling the data storage device to a host system;
a device memory; and
a controller configured to:
receive a first request for data from the host system via the host interface; and
in response to detecting a pattern in requests for data, from the host system, and while transferring data, to the host system, corresponding to the first request:
load a first portion of data for a subsequent request for data, based on the pattern, from the device memory into a buffer;
initiate a transfer of a second portion of data for the subsequent request for data, to a latch in the device memory; and
in response to receiving the subsequent request for data from the host system: (i) transfer the first portion of data from the buffer to the host system, and (ii) transmit a read request to the device memory, for the second portion of data, thereby causing the device memory to transfer the second portion of data from the latch in the device memory, to the host system.

2. The data storage device of claim 1, wherein the controller is configured to:
in accordance with a determination that (i) a depth of a queue for commands from the host system is below a predetermined threshold, and (ii) a size of commands in the queue for commands is above a predetermined size, load the first portion of data and initiate the transfer of the second portion of data.

3. The data storage device of claim 1, wherein the controller is configured to:
predict, based on the pattern, the subsequent request for data from the host system.

4. The data storage device of claim 1, wherein the controller is configured to:
in accordance with a determination that a size of commands in a queue for commands from the host system is below a predetermined size, load the first portion of data and the second portion of data into the buffer; and
in response to receiving the subsequent request for data from the host system, transfer the first portion of data and the second portion of data, from the buffer, to the host system.

5. The data storage device of claim 1, wherein the first request corresponds to a first logical block address and the subsequent request corresponds to a second logical block address at a predetermined offset from the first logical block address.

6. The data storage device of claim 5, wherein the first request corresponds to a read request for a predetermined size of data starting from a first logical block address, wherein the subsequent request corresponds to another read request for the predetermined size of data starting from a second logical block address at an offset from the first logical block address, and wherein the offset is equal to the predetermined size.

7. The data storage device of claim 1, wherein the controller is configured to:
continue to repeat operations for loading a first portion of data and initiating a transfer of a second portion of data for each of sequential requests for data following the subsequent request for data, while transferring data to the host system, as long as the pattern is detected.

8. A method implemented using one or more controllers for one or more data storage devices, the method comprising:
receiving a first request for data from a host system via a host interface; and
in response to detecting a pattern in requests for data, from the host system, and while transferring data, to the host system, corresponding to the first request:
loading a first portion of data for a subsequent request for data, based on the pattern, from a device memory into a buffer;
initiating a transfer of a second portion of data for the subsequent request for data, to a latch in the device memory; and
in response to receiving the subsequent request for data from the host system: (i) transferring the first portion of data from the buffer to the host system, and (ii) transmitting a read request to the device memory, for the second portion of data, thereby causing the device memory to transfer the second portion of data from the latch in the device memory, to the host system.

9. The method of claim 8, further comprising:
in accordance with a determination that (i) a depth of a queue for commands from the host system is below a predetermined threshold, and (ii) a size of commands in the queue for commands is above a predetermined size, loading the first portion of data and initiating the transfer of the second portion of data.

10. The method of claim 8, further comprising:
predicting, based on the pattern, the subsequent request for data from the host system.

11. The method of claim 8, further comprising:
in accordance with a determination that a size of commands in a queue for commands from the host system is below a predetermined size, loading the first portion of data and the second portion of data into the buffer; and
in response to receiving the subsequent request for data from the host system, transferring the first portion of data and the second portion of data, from the buffer, to the host system.

12. The method of claim 8, wherein the first request corresponds to a first logical block address and the subsequent request corresponds to a second logical block address at a predetermined offset from the first logical block address.

13. The method of claim 12, wherein the first request corresponds to a read request for a predetermined size of data starting from a first logical block address, wherein the subsequent request corresponds to another read request for the predetermined size of data starting from a second logical block address at an offset from the first logical block address, and wherein the offset is equal to the predetermined size.

14. The method of claim 8, further comprising:
continuing to repeat operations for loading a first portion of data and initiating a transfer of a second portion of data for each of sequential requests for data following the subsequent request for data, while transferring data to the host system, as long as the pattern is detected.

15. A system, comprising:
means for receiving a first request for data from a host system via a host interface; and means for, in response to detecting a pattern in requests for data, from the host system, and while transferring data, to the host system, corresponding to the first request:
  loading a first portion of data for a subsequent request for data, based on the pattern, from a device memory into a buffer;
  initiating a transfer of a second portion of data for the subsequent request for data, to a latch in the device memory; and
  in response to receiving the subsequent request for data from the host system: (i) transferring the first portion of data from the buffer to the host system, and (ii) transmitting a read request to the device memory, for the second portion of data, thereby causing the device memory to transfer the second portion of data from the latch in the device memory, to the host system.

16. The system of claim 15, further comprising:
means for, in accordance with a determination that (i) a depth of a queue for commands from the host system is below a predetermined threshold, and (ii) a size of commands in the queue for commands is above a predetermined size, loading the first portion of data and initiating the transfer of the second portion of data.

17. The system of claim 15, further comprising:
means for, predicting, based on the pattern, the subsequent request for data from the host system.

18. The system of claim 15, further comprising:
means for, in accordance with a determination that a size of commands in a queue for commands from the host system is below a predetermined size, loading the first portion of data and the second portion of data into the buffer; and
means for, in response to receiving the subsequent request for data from the host system, transferring the first portion of data and the second portion of data, from the buffer, to the host system.

19. The system of claim 15, wherein the first request corresponds to a first logical block address and the subsequent request corresponds to a second logical block address at a predetermined offset from the first logical block address.

20. The system of claim 15, further comprising:
means for, continuing to repeat operations for loading a first portion of data and initiating a transfer of a second portion of data for each of sequential requests for data following the subsequent request for data, while transferring data to the host system, as long as the pattern is detected.

* * * * *